United States Patent [19]

Padgett

[11] 4,375,291
[45] Mar. 1, 1983

[54] BACK-UP MECHANICAL SEAL

[75] Inventor: Arnold F. Padgett, Don Mills, Canada

[73] Assignee: Borg-Warner Corporation, Chicago, Ill.

[21] Appl. No.: 300,152

[22] Filed: Sep. 8, 1981

[51] Int. Cl.³ .................... F16J 15/46; B65D 53/06; F04D 29/08
[52] U.S. Cl. .................................. 277/27; 277/3; 277/58; 277/237 R; 277/DIG. 10; 415/174
[58] Field of Search .............. 277/27, 3, 58, 65, 118, 277/119, 120, 122, 237, DIG. 10; 415/170 R, 174

[56] References Cited

U.S. PATENT DOCUMENTS

| | | |
|---|---|---|
| 1,331,360 | 2/1920 | Parsons et al. |
| 3,096,985 | 7/1963 | Biheller |
| 3,510,230 | 5/1970 | Raub .......................... 415/174 |
| 3,947,044 | 3/1976 | Friedrich ....................... 277/3 |

FOREIGN PATENT DOCUMENTS

| | | | |
|---|---|---|---|
| 265155 | 5/1962 | Australia ............... 277/DIG. 10 |
| 814855 | 6/1969 | Canada ............................ 277/27 |

Primary Examiner—Stuart S. Levy
Assistant Examiner—Lloyd Doigan
Attorney, Agent, or Firm—Aubrey L. Burgess

[57] ABSTRACT

A pump assembly having an impeller for pumping a fluid from an intake to an outlet, a prime mover for driving the impeller, and a primary mechanical seal assembly between the prime mover and the impeller which is located in a housing. The mechanical seal assembly substantially prevents leakage of the fluid being pumped along a shaft connecting the impeller and the prime mover. A secondary mechanical seal means is located in the housing between the prime mover and the mechanical seal assembly. The secondary seal means is constructed of a material, such as carbon, which will collapse under pressure of the fluid being pumped upon failure of the primary mechanical seal assembly, to substantially prevent the leakage of fluid along the shaft and to the exterior of the housing.

10 Claims, 4 Drawing Figures

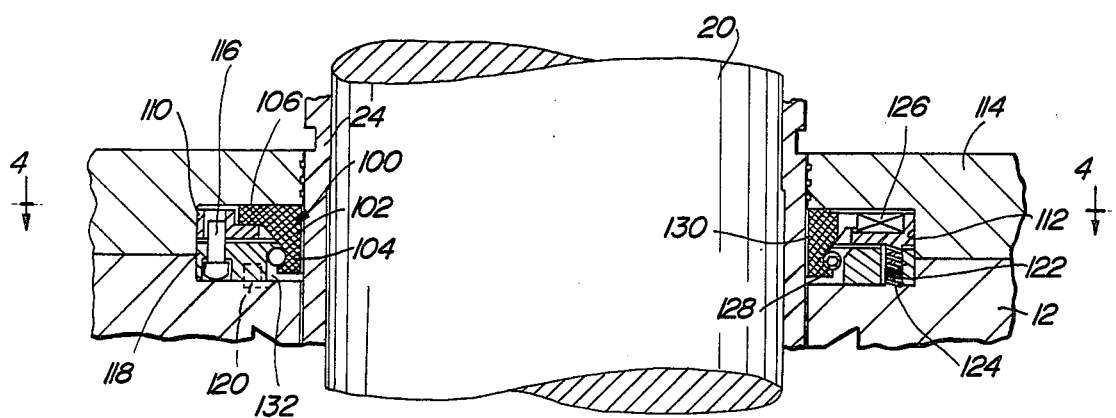
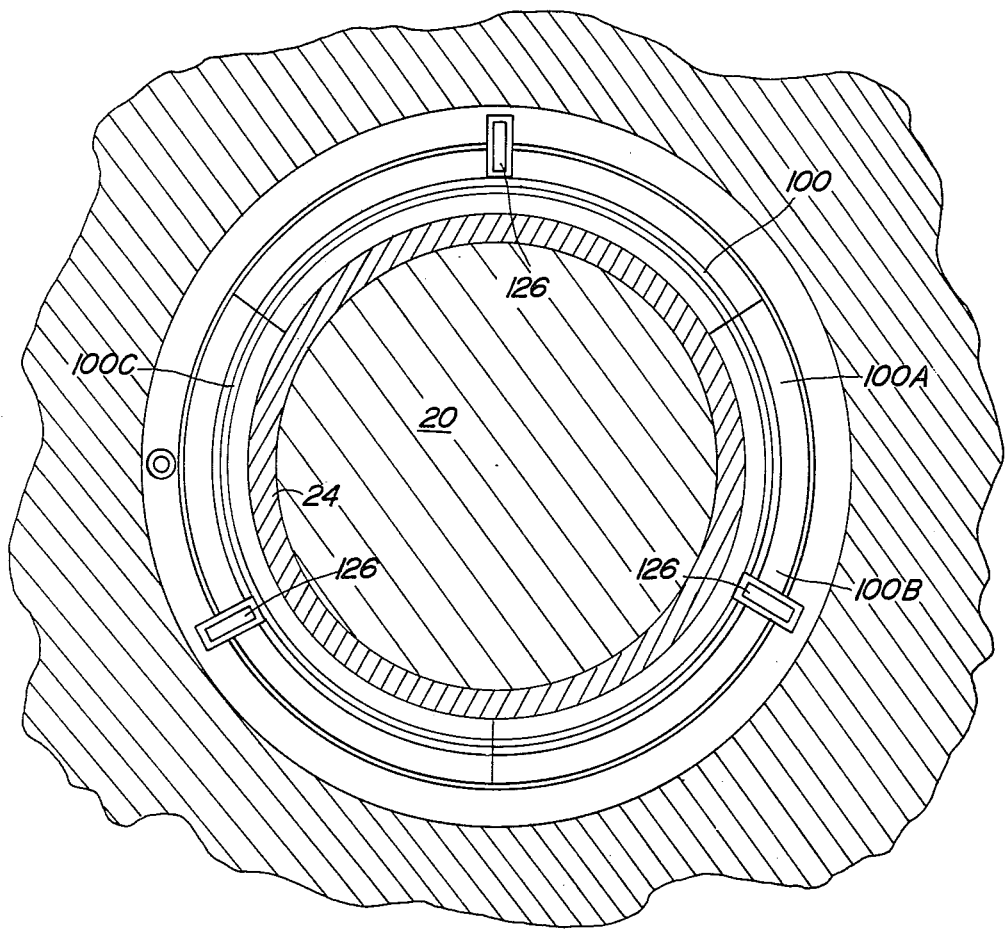

BACK-UP MECHANICAL SEAL

BACKGROUND OF THE INVENTION

In pump assemblies which comprise one or more impellers driven by a prime mover connected to the impeller by a drive shaft, mechanical seal assemblies are generally provided for preventing substantial fluid leakage along the drive shaft. These seal assemblies may include multiple mechanical seals, each comprising rotatable and stationary seal rings each having a seal face opposing one another, the rotatable seal ring being connected to the drive shaft or a drive shaft sleeve while the stationary seal ring is connected to a housing or pump case. In some of the multiple units, as described, the second seal assembly acts as a back-up for the first assembly. In the event of failure of both seal assemblies of a multiple unit, pumped fluid can leak along the shaft and escape from the housing.

It is also known in the art to construct pumps with primary and secondary mechanical seals, as for example, the arrangement described in Biheller U.S. Pat. No. 3,096,985. The secondary seal in that reference comprises a sleeve member having a serrated edge which engages a tapered section of a drive shaft and which acts as a labyrinth to break down the pressure of the leaking fluid to either eliminate or severely limit leakage along the shaft to the exterior of the housing. There is still a need for a non-engaging and thus non-wearing secondary seal which effectively prevents fluid leakage when the primary seal fails.

SUMMARY OF THE INVENTION

The invention to be herein described relates to a pump assembly which includes a primary mechanical seal assembly, preferably of the multiple seal variety, and an improved back-up or secondary seal means which is so constructed and arranged to substantially prevent the escape of fluid being pumped from the pump housing upon failure of the primary seal assembly. The secondary seal means comprises a ring, preferably of abutting multiple parts or segments, which is supported against rotation and surrounds the drive shaft or the shaft sleeve. The ring, because of its support, is non-wearing and is constructed of a material which will collapse under pressure of the pumped fluid in the event of failure of the primary seal assembly. In so doing, the collapsed ring seals the space between the shaft and the housing or case to substantially prevent the escape of the fluid to the exterior of the housing. One suitable material from which the secondary seal ring is constructed is carbon; other features will be explained hereinafter. The invention herein described is especially applicable to pumps for power generating stations using nuclear energy, and the drawings illustrate the seal arrangement in a nuclear pump environment.

BRIEF DESCRIPTION OF THE DRAWINGS

FIG. 3 is a sectional showing on a scale enlarged relative to that of FIG. 2, of the secondary seal means of this invention; and FIG. 4 is a sectional view on line 4—4 of FIG. 3.

DESCRIPTION OF THE PREFERRED EMBODIMENT

Figure 1:
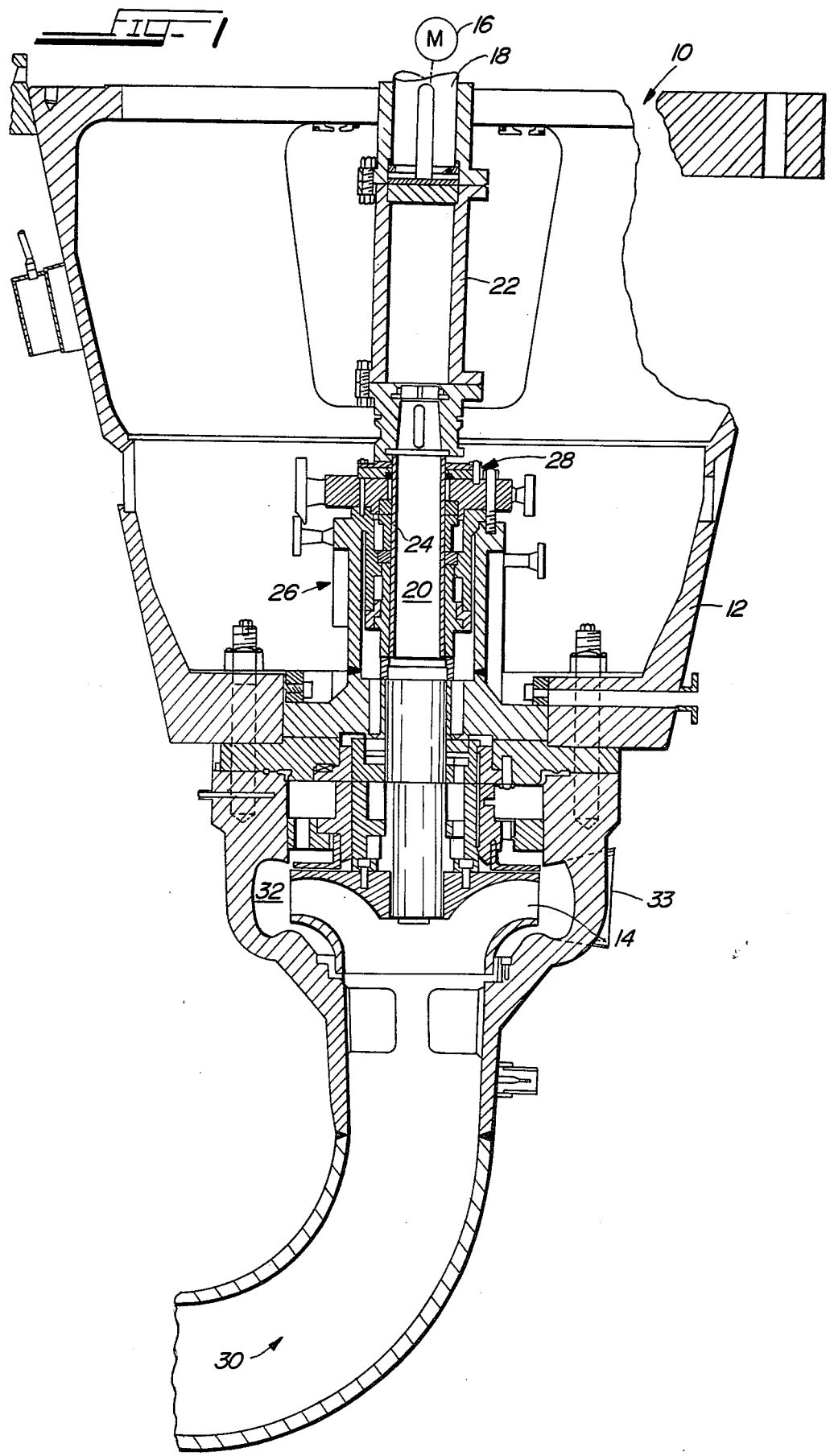
FIG. 1 is a cross-section of a typical pump assembly incorporating this invention.

FIG. 1 of the drawings illustrates a pump assembly 10 which comprises a multiple-part housing or case 12 in which there is a centrifugal impeller 14 driven by a motor 16. The motor shaft 18 is coupled to the impeller shaft 20 by coupling means 22. A sleeve 24 surrounds the impeller shaft 20 and is associated with a primary mechanical seal assembly 26. The shaft sleeve 24 and the primary mechanical seal assembly 26 can be assembled as a cartridge and can be replaced as a unit when repair of the seal assembly becomes necessary. Closely adjacent to the primary seal assembly 26 is a secondary mechanical seal means 28 to which the description hereafter will be primarily directed. The secondary mechanical seal functions to substantially prevent the flow of pumped fluid along the shaft 20 to the exterior of the case in the event of failure of the primary mechanical seal assembly 26. The impeller 14 pumps fluid from an inlet or suction 30 into a volute 32 to an outlet or discharge 33.

Figure 2:
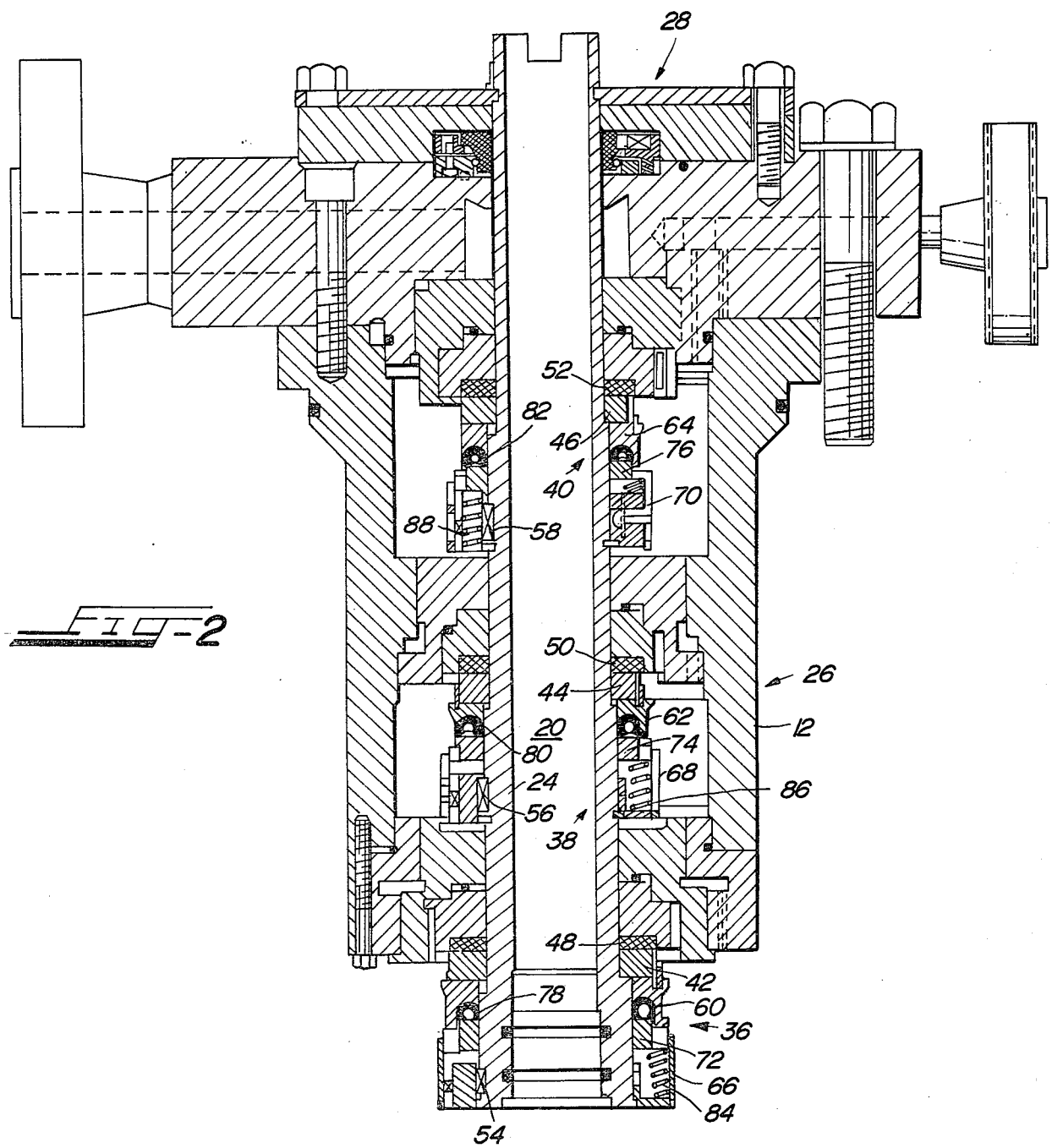
FIG. 2 is a sectional view of the invention showing a primary mechanical seal assembly and the secondary seal means of this invention on a scale enlarged relative to that of FIG. 1.

The primary mechanical seal assembly 26 is best illustrated in FIG. 2, and as before mentioned, is associated with a shaft sleeve 24 surrounding the impeller shaft 20. The seal assembly 26 comprises, from bottom to top of the drawing, a first mechanical seal 36, a second mechanical seal 38 and a third mechanical seal 40. Each seal comprises, generally, a rotating seal ring or rotor 42, 44 and 46, respectively, and a stationary seal ring or stator 48, 50 and 52, respectively. The rotating and stationary seal rings of each seal have opposing seal faces with lapped surfaces. The rotating seal rings 42, 44 and 46 are connected for rotation to the shaft sleeve 24 by drive keys 54, 56 and 58 through conventional means such as rotor holders 60, 62 and 64, spring holders 66, 68 and 70, U-cup followers 72, 74 and 76, and U-cups 78, 80 and 82. Springs 84, 86 and 88 in the spring holders urge the rotors toward the stators. Various passageways are provided to withdraw any fluid which leaks across the opposing seal faces. In the event of primary seal failure, the secondary mechanical seal means 28 is provided.

The secondary seal means 28 is best shown in FIGS. 3 and 4; however, its position with respect to the other components of the entire assembly and to the primary mechanical seal assembly is illustrated in FIGS. 1 and 2. The secondary mechanical seal means 28 comprises a segmented seal ring 100 surrounding but spaced from the sleeve 24. The ring 100 is preferably constructed of three abutting segments 100A, 100B and 100C, as shown in FIG. 4. The seal ring could be made of one piece or fewer or more segments without departing from the spirit of the invention. Each segment is substantially the same and comprises a body portion 102, an axial flange portion 104 and a radial flange portion 106. The ring 100 is supported against rotation by an annular support 110 located with the ring 100 within a cavity 112 defined by the housing or case 12 and a cover 114. The support 110 is fixed against rotation by one or more drive pins 116 held by an annular member 118 received in the cavity 112 and fixed to the housing or case 12 by a flat head machine screw 120. The member 118 is a spring holder having a plurality of spring pockets 122 for coil springs 124 which resiliently urge or bias the support 110 axially toward the flange 106 of the ring 100. Each segment of the ring 100 is keyed by a key 126 to the support 110 and the segments 100A, 100B and 100C are held in assembled relationship by a garter spring or the like 128. Because the ring 100 is noncontacting, i.e., does not contact the sleeve 24, the ring is non-wearing; however, the ring 100 and its segments, are constructed of a material, such as carbon, which will collapse under the pressure of pump fluid in the event of primary mechanical seal failure to seal the space between the housing or case cover 114 and substantially prevent the leakage of pumping fluid to the exterior of the housing or case. The particular shape of the seal ring as illustrated is preferably computer designed to enhance the collapsing characteristic and thus provide a seal which is pressure sensitive having a sealing range from low pressure with primary seal failure to full system pressure with complete primary seal failure.

The sleeve 24 will still be rotatable after collapse of the ring 100 and because the ring is made of carbon, the sleeve will not seize, permitting an orderly shut down and repair of the seals.

In operation, the crushable ring 100 is normally out of contact with sleeve 24, as shown in FIG. 3. There may be a slight accumulation of fluid in the clearance volume 130 between ring 100 and sleeve 24. However, if the primary seal fails, there is a rapid flow to fluid into the area 132 between segmented seal ring 100 and the outer members 110 and 118. This relatively large, rapidly accumulating fluid volume provides a pressure unbalance across the segmented ring which crushes the secondary seal 100, driving it inwardly to bear against sleeve 24 and shut off any flow of fluid along the sleeve. This action substantially prevents the leakage of any pumped fluid to the exterior of the housing or the case.

I claim:

1. In a pump assembly having a housing defining an inlet and an outlet, an impeller for pumping a fluid from the intake to the outlet, means including a shaft to drive the impeller, and a mechanical seal assembly located between the drive means and the impeller within the housing for substantially preventing the leakage of the fluid being pumped along the shaft, the improvement which comprises:
   a secondary mechanical seal means located between the mechanical seal assembly and said drive means and adjacent to the exterior of said housing, said secondary seal means comprising:
   a seal ring surrounding said shaft with a predetermined space therebetween;
   a non-rotatable support
   means to connect said seal ring to said support; and
   means biasing said support toward said seal ring; said seal ring being constructed of a material which will collapse under pressure of fluid being pumped upon failure of said mechanical seal assembly to seal said predetermined space between said seal ring and said shaft to substantially prevent leakage of fluid along said shaft and to the exterior of said housing.

2. A pump assembly as recited in claim 1 in which said seal ring is constructed of carbon.

3. A pump assembly as recited in claim 1 in which said seal ring is constructed in segments, the adjacent ones of which abut one another.

4. A pump assembly as recited in claim 3, and further comprising means holding said seal ring segments in abutting relationship.

5. A pump assembly as recited in claim 4, in which said holding means comprises a garter spring.

6. A pump assembly as recited in claim 3, in which each segment of said seal ring has a body portion and axially extending and radially extending portions.

7. A pump assembly as recited in claim 3, in which said seal ring is constructed of three segments, each extending through an arc of approximately 120°.

8. A pump assembly as recited in claim 1, in which said biasing means comprise coil springs.

9. A pump assembly as recited in claim 7, further comprising a spring holder non-rotatably positioned in a cavity, and a pin supported in said spring holder which extends into said support means permitting biasing of said support means toward said seal ring.

10. A secondary mechanical seal means for a centrifugal pump to prevent the escape of pumping fluid along a rotatable pump shaft to the exterior of the pump housing in the event of failure of a primary mechanical seal means comprising:
    a seal ring constructed of segments of carbon surrounding and spaced from said shaft;
    means to hold said segments in assembled relationship around said shaft; and
    means to support said seal ring against rotation with said shaft; said carbon seal ring segments being so constructed and arranged to collapse under pressure of pumped fluid and to seal against said shaft upon failure of said primary mechanical seal means while permitting said shaft to rotate until shutdown of said pump.

* * * * *